United States Patent [19]

Faith et al.

[11] Patent Number: 4,764,949
[45] Date of Patent: Aug. 16, 1988

[54] SUBSCRIBER/CRAFTSPERSON RINGBACK APPARATUS

[75] Inventors: Richard W. Faith, Oxnard, Calif.; Len Curtin, Houston, Tex.

[73] Assignee: Harris Corp., Melbourne, Fla.

[21] Appl. No.: 55,121

[22] Filed: May 28, 1987

[51] Int. Cl.$^4$ .......................... H04B 3/46; H04M 3/24
[52] U.S. Cl. .......................................... 379/9; 379/22; 379/27
[58] Field of Search ................... 379/9, 22, 10, 18, 26, 379/27, 29, 1

[56] References Cited

U.S. PATENT DOCUMENTS

4,670,898  6/1987  Pierce et al. ...................... 379/29 X

Primary Examiner—Stafford D. Schreyer
Attorney, Agent, or Firm—Antonelli, Terry & Wands

[57] ABSTRACT

A telephone ringback apparatus includes a microprocessor-controlled communications device which is connectable with telephone equipment contained in a central office, such as a toll trunk facility, having the capability of identifying the number of a calling party. In response to the telephone user dialing a prescribed ringback access code, the apparatus signals the toll trunk facility causing it to transmit a message representative of the number of the telephone from which the user is calling. Upon receipt of this message the telephone number of the calling party is stored. A synthesized voice message is transmitted to the user instructing the user to hang-up. When the apparatus detects that the phone has been placed back on-hook, it proceeds to transmit dialing signals containing the previously stored number of the telephone, causing the calling party's telephone to ring. As an additional feature the apparatus is designed to carry out prescribed signalling tests, in response to prescribed test codes input by a craftsperson. Depending on the contents of a test code the apparatus may generate a series of prescribed tones or terminate the line with a precision impedance, enabling the craftsperson to conduct line quality measurements from his calling location.

32 Claims, 4 Drawing Sheets

SUBSCRIBER/CRAFTSPERSON RINGBACK APPARATUS

FIELD OF THE INVENTION

The present invention relates in general to telephone systems and is particularly directed to a communication apparatus that is installed in a central office for enabling a subscriber or craftsperson to ring back the telephone from which that person is calling.

BACKGROUND OF THE INVENTION

The continuing expansion of the communications industry, particularly the rapidly increasing use of telephone networks by non industrial and non commercial enterprises, has brought about requirements for standardizing and simplifying user access to an ever increasing variety of equipment and services. Considering the many different types of devices currently available and the desirability that users be able to install and maintain their own equipment, one of these requirements is that there be a uniform scheme through which all users, including subscribers and craftspersons, are able to test a telephone line by means of a noncomplicated ringback procedure. While the more recently developed systems provide a high degree of flexibility and functionality, older central office equipment is performance limited, so that only service personnel may be permitted access to the ringback function. Moreover, for each respective code (usually the first three digits of a seven digit number) associated with different dedicated equipment through which the user accesses the ringback function, the telephone company loses the capability to provide service to approximately ten thousand subscriber lines, thereby accelerating the need to subdivide area code regions.

SUMMARY OF THE INVENTION

In accordance with the present invention there is provided a new and improved telephone apparatus that is readily interfaced with different types of central office equipment and through which a telephone user (either a subscriber or a craftsperson) is able to ring back the telephone from which the person is calling by means of a prescribed ringback access code. Pursuant to the present invention, the apparatus includes a microprocessor-controlled communications device which is connectable with telephone equipment contained in the central office, such as a toll trunk facility, having the capability of identifying the number of a calling party. In response to the telephone user dialing a prescribed ringback access code, the apparatus signals the toll trunk facility causing it to transmit a message representative of the number of the telephone from which the user is calling. (To accommodate varying code number requirements of telephone companies, the apparatus may be programmed to ignore selected portions of the dialed number, so as to be responsive to only that portion of the generated code corresponding to the prescribed ringback access code.) Upon receipt of this message the telephone number of the calling party is stored.

The apparatus then transmits a synthesized voice message to the user instructing the user to hang-up (return the telephone to its idle condition). When the apparatus detects that the phone has been placed back on-hook, it proceeds to transmit dialing signals containing the previously stored number of the telephone, causing the ringing of the telephone. If the apparatus detects that the user's line is busy, it radials the user's telephone number a prescribed number of times or until the phone rings. When the user answers, or after a fixed number of rings, the apparatus disconnects itself. Alternatively, the apparatus may be programmed to continuously redial the user's telephone number until contact is achieved or until a fixed time interval has elapsed.

As an additional feature the apparatus is designed to carry out prescribed signalling tests initiated by the craftsperson. For this purpose, rather than hang-up in response to the synthesized voice instruction to do so, the craftsperson remains on-line. This remaining-on-line condition is detected by the apparatus, which then issues another voice message to the user instructing the user to key in a test access code. Depending on the contents of the code the apparatus may generate a series of prescribed tones or terminate the line with a precision impedance, enabling the craftsperson to conduct line quality measurements from his calling location.

DETAILED DESCRIPTION

Figure 1A:
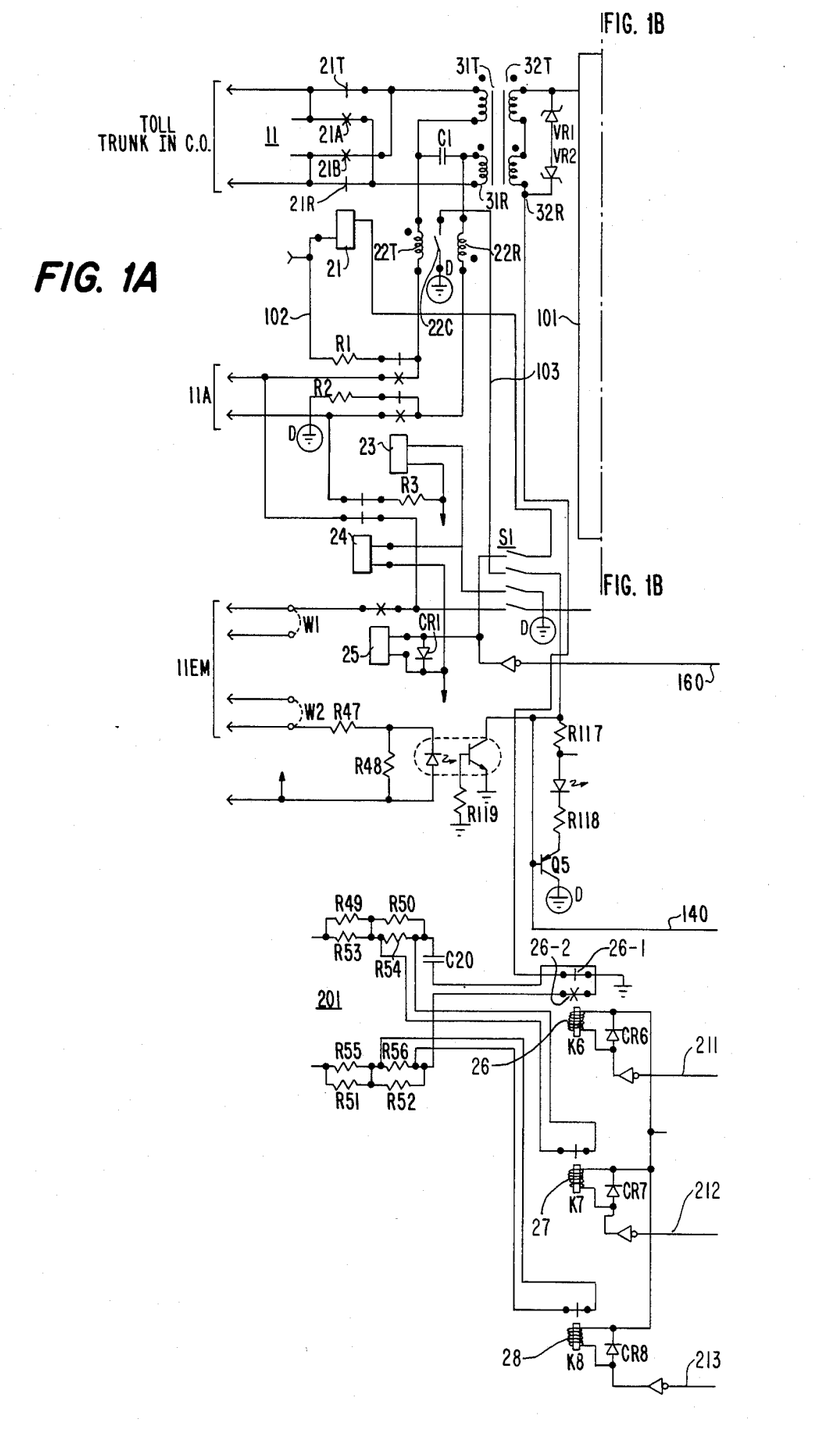
FIGS. 1A, 1B, 1C, and 2, taken together, are a schematic diagram of a subscriber/craftsperson ringback apparatus in accordance with the present invention.
Figure 1B:
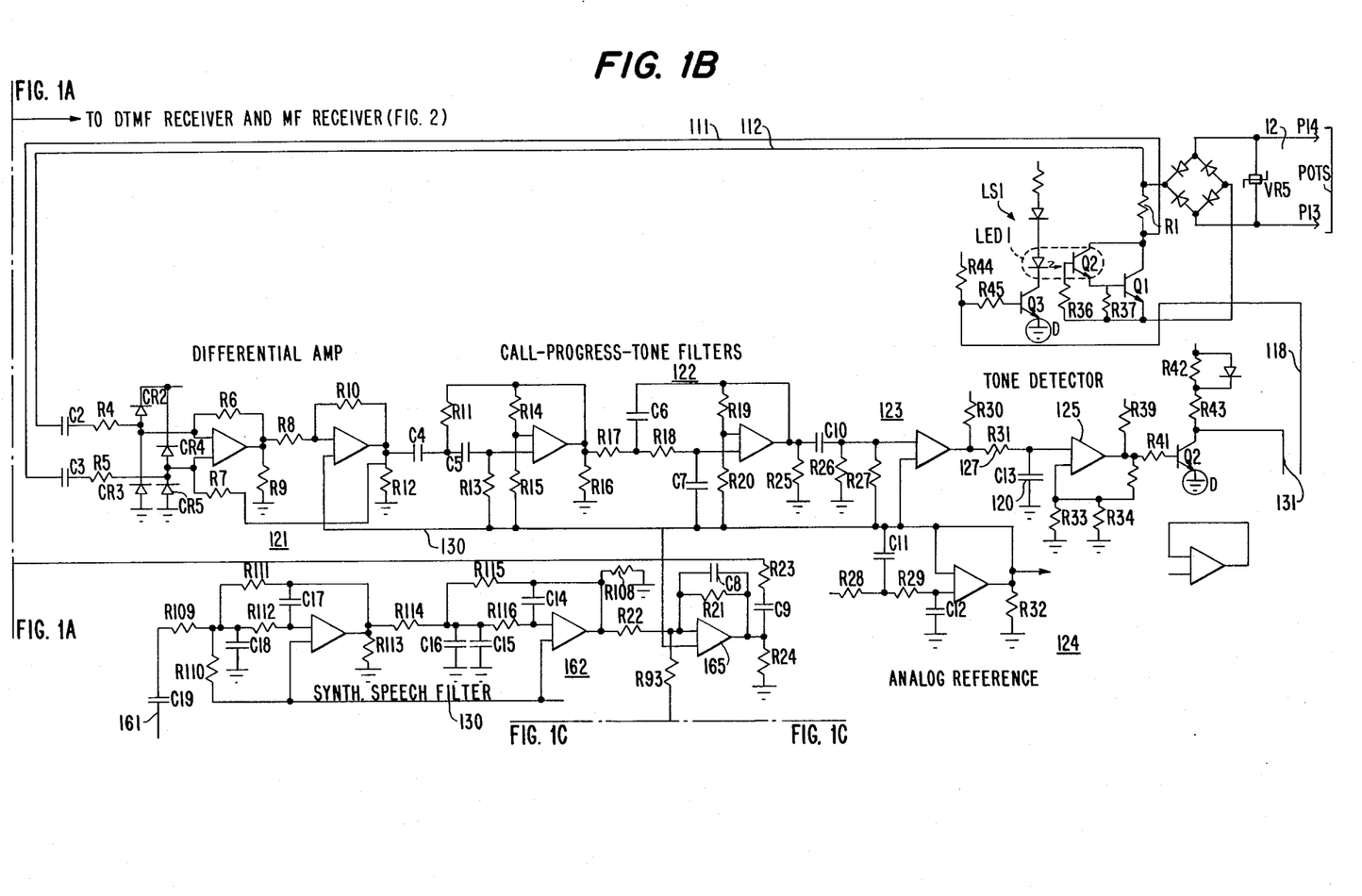
Figure 1C:
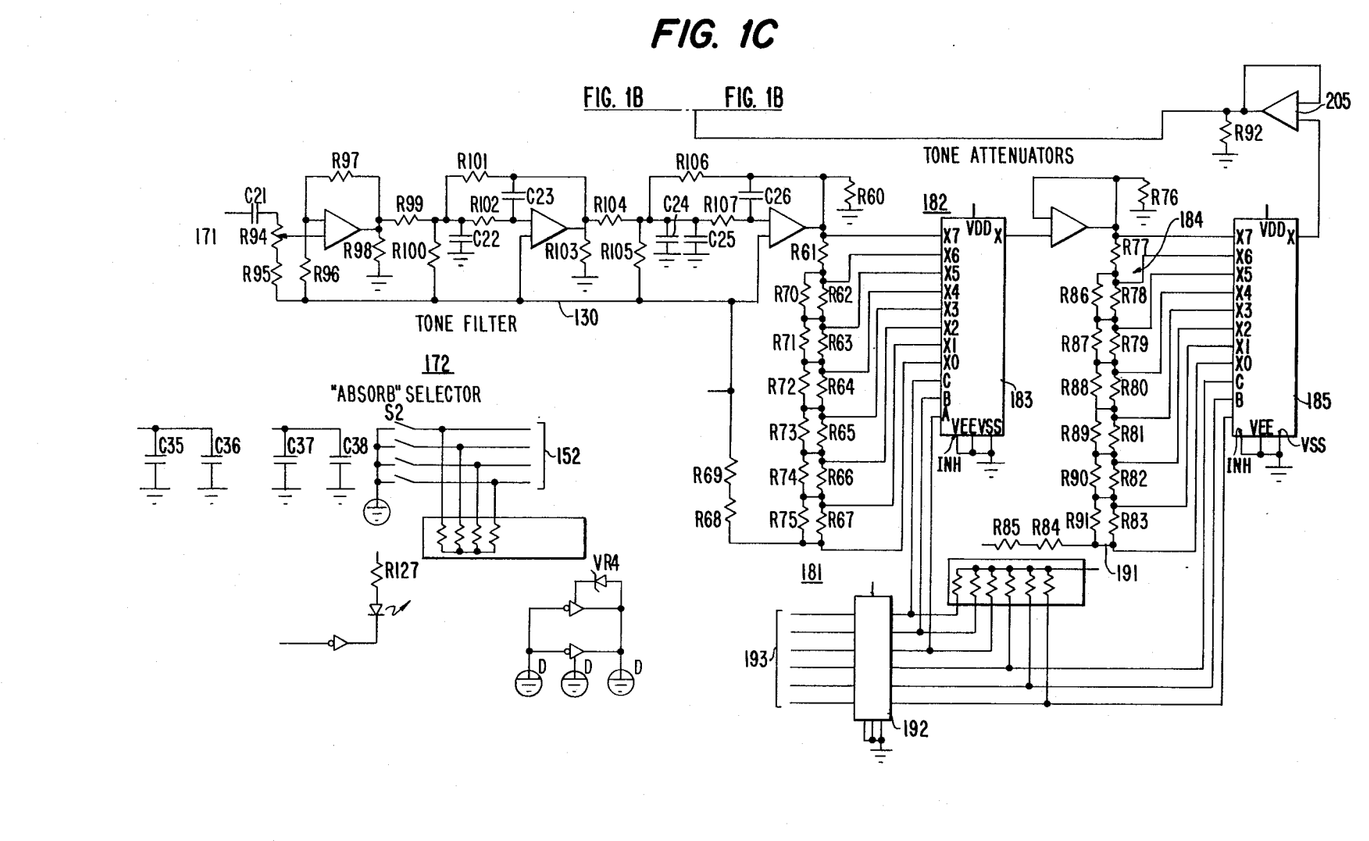
Figure 2:
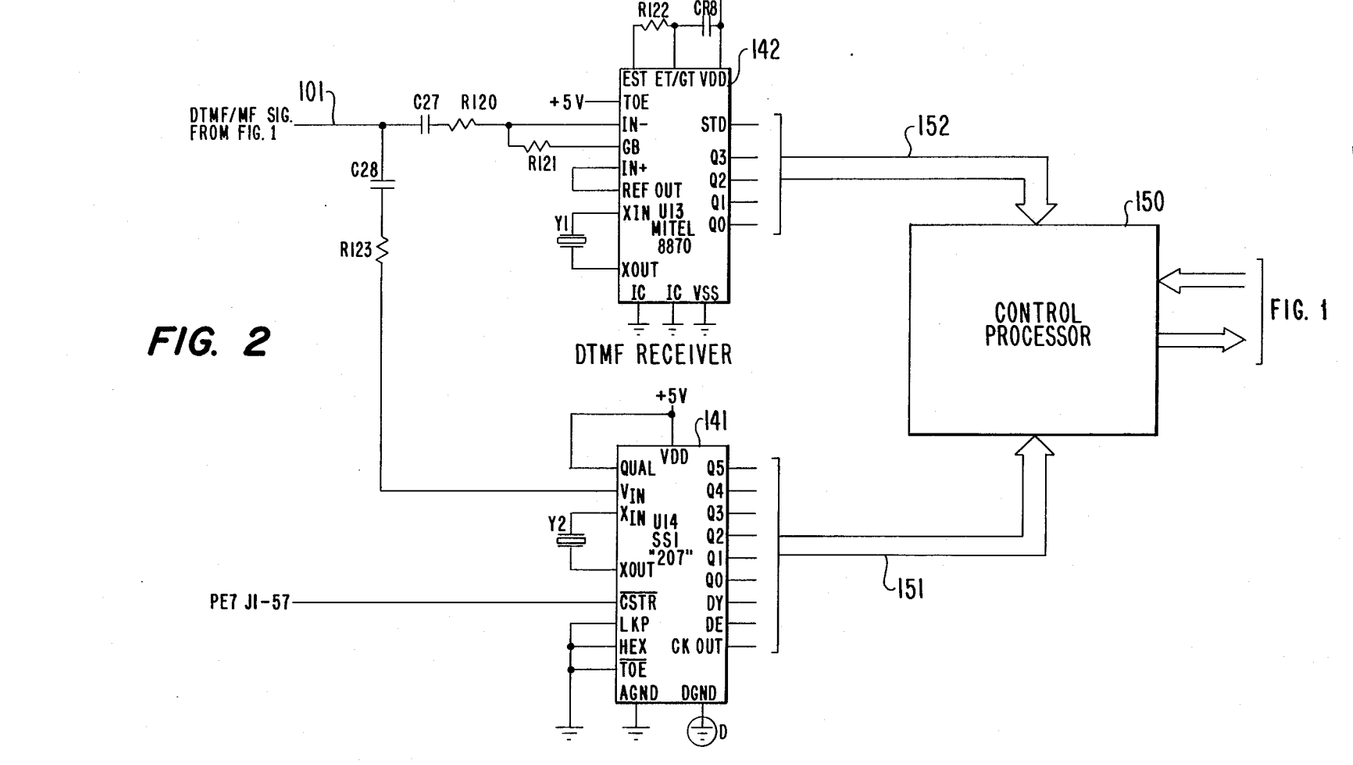

Referring now to FIGS. 1 and 2, there is illustrated a schematic diagram of a subscriber/craftsperson ringback apparatus in accordance with the present invention. As pointed out previously, the ringback apparatus is coupled to a communications circuit facility within the central office having the capability of identifying the telephone number of a calling party. As the toll trunk facility within a central office is capable of performing this function, the communications equipment preferably employs the toll trunk which is connectable to the ringback apparatus through respective tip (T) and ring (R) leads of a telephone link 11. The ringback apparatus accesses the central office in order to ring the subscriber's telephone via (POTS) line 12.

The tip and ring portions of link 11 are coupled through normally closed contacts 21T and 21R of a relay 21 to respective primary coils 31T and 31R of a coupling transformer T1. The secondary of the transformer T1 comprises a pair of diode protected coils 32T and 32R coupled in circuit with line 101. It is through line 101 that tone and speech signals are exchanged between link 11 and analog processing circuitry, to be described below.

Relay 21 is coupled in circuit with an energizing battery link 102 and through switch S1-1 of a trunk type-select multi-switch S1, to a control line 160 from a control processor to be described below. The contacts 21T, 21R of relay 21 are normally closed, while contacts 21A and 21B are normally open, as shown. These contacts are momentarily reversed in response to a switching signal on line 160, as will be explained below in the description of operation. Trunk type-select multi-switch S1 and associated relays 21-25 are provided to facilitate interfacing of the subscriber ringback apparatus with a variety of central office circuits, as will be discussed infra.

The primary coils 31T and 31R of transformer T1 are coupled in circuit with coils 22T and 22R of a relay 22, contact 22C of which is coupled between ground and a link 103 to switch contact S1-2 of trunk type-select multi-switch S1. As shown in FIG. 1, contact 22C is normally open. Contact 22C is coupled over link 103 through switch S1-2 of multi-switch S1 to a line 140 for supplying a "trunk seize" representative signal, that is monitored by a control processor 150.

The respective conductors of link 12 are coupled through a full wave rectifier diode bridge BR1 to a line seizure circuit LS1. Line seizure circuit LS1 includes a pair of switching transistors Q1 and Q3 and electro-opto isolator 15 comprised of light emitting diode LED1 and transistor Q2. The base of transistor Q3 is coupled over a link 118 to the output of control processor 150. When the line is to be seized, processor 150 asserts a high state on link 118 to turn on transistor Q2 and operate line seizure circuit LS1.

As will be described below in conjunction with the description of the operation of the ringback apparatus, control processor 150 supervises and controls the operation of the respective circuits of the apparatus. For this purpose, control processor 150 may comprise a conventional microprocessor and attendant memory (ROM, RAM) units for program and data storage. Rather than provide a detailed description of these components (which description is unnecessary for an understanding of the present invention), the description to follow will detail the operational events that are controlled by and the interfacing of signals with the processor, in order that the invention may be more readily understood.

The commonly connected collectors of transistors Q1 and Q2 of line seizure circuit LS1 are coupled to one side of a line terminating resistor R1, the other side of which is coupled to full wave rectifier diode bridge BR1. The opposite sides of resistor R1 are connected, in turn, to links 111 and 112 which are coupled to the respective inputs of a differential amplifier 121, which provides necessary differential mode voltage amplification, while rejecting common mode signals. Link 130 provides differential amplifier 121 with D.C. bias voltage from an analog reference voltage circuit 124. The output of differential amplifier 121 is coupled through a call progress tone filter 122 which is tuned to pass dial tone and busy tone. The output of tone filter 122 is coupled to one input of a comparator 123, a second input of which is supplied over link 130 from the output of analog reference voltage circuit 124. Comparator 123 compares the level of the signal supplied at the output of tone filter 122 with an appropriate fraction of the reference voltage on line 130, to identify dial tone.

The output of comparator 123 is supplied to a tone detector 125 which is coupled through a transistor Q4 to a link 131, to supply a digital (low or high voltage) level indicative of the respective presence or absence of dial tone or busy tone to control processor 150. Tone detector 125 includes a normally charged capacitor 126 and resistor 127 coupled at the output of comparator 123. In response to dial tone or busy tone signals, capacitor 126 is discharged through resistor 127 causing the output of tone detector 125 to go to a high voltage state, turning on transistor Q2 which, in turn, pulls down the voltage on link 131 to a low state.

As pointed out above, multi-frequency (dialed number) signalling from the toll trunk and synthesized voice signals to be output to the central office are coupled over link 101. Both multi-frequency signalling and dual tone multi-frequency signals are coupled over link 101 to respective multi-frequency and dual tone multi-frequency decoders 141 and 142, respectively. Each of decoders 141 and 142 supplies digital output codes over respective links 151 and 152 to control processor 150. Control processor 150 stores the codes supplied from decoders 141 and 142 and takes communication control action in using these numbers in accordance with its stored ringback program.

The synthesis of a voice message to the telephone user is effected by a speech synthesizer (not shown) under the control of control processor 150. The synthesized speech signals are coupled over link 161 through a synthetic speech filter 162, the output of which is coupled via line driver 165 to link 101 for application to the secondary coils 32T and 32R of transformer T1.

Control processor 150 also controls the generation of tone signals through which the craftsperson may monitor the quality of the line. The tone signals themselves are supplied over link 171 to a tone filter 172, the output of which is coupled to a precision resistor ladder network 181 of a tone attenuator 182. Respective outputs of the resistor ladder network 181 are coupled through a multiplexer 183 and an amplifier 184 to a second precision resistor ladder network 191, the opposite end of which is coupled to the output of analog reference circuit 124 for setting appropriate D.C. bias.

Control of multiplexers 182 and 185 is effected by the outputs of a logic level translator 192 which receives a multi-bit digital control word over link 193 from processor 150. Through digital link 193, processor 150 is able to prescribe the degree of attenuation of the tone signals coupled through tone filter 172 through tone attenuator 182. The output of the tone attenuator 182 is derived from the output of multiplexer 185 through amplifier 205 which is also coupled to the input of telephone line driver amplifier 165.

As mentioned above, one aspect of the line quality test feature that is incorporated into the subscriber ringback unit in accordance with the present invention is the placement of a precision impedance termination across the tip and ring leads T and R of link 11. For this purpose, a precision resistor network 201 is coupled to ports A and B of link 11 and selectively controlled by a set of relays 26, 27 and 28. Contact 26-1 of relay 26 is normally closed and terminates secondary coil 32R of transformer T1 to ground, as shown. When energized, relay 26 opens contact 26-1 and closes contact 26-2, so as to effectively decouple the secondary coils 32 of transformer T1 and place a selected combination of the resistors of network 201 across the tip end ring leads T and R of link 11 through ports A and B. Selection of the resistors is accomplished by relays 27 and 28 which control the resistor values of the precision resistors of the network by controllably shorting approproate parallel-connected pairs of resistors of the network through contacts 27-1 and 28-1 as shown. Control of the operation of relays 26, 27 and 28 is carried out by signals supplied over links 211–213 from processor 150.

Part of the versatility of the present invention is its ability to be selectively coupled with various types of central office trunks. As noted above, the subscriber ringback apparatus is not limited to operation with a two-wire central office toll trunk; it also accomodates such toll trunk types as "two-wire plus A & B leads" and "E & M" (Ear and Mouth) configured trunks, including E&M types I, II and III. For this purpose, relays 23, 24 and 25 are coupled between links 11A and 11EM and the contacts S1-1 . . . S1-4 of trunk type-select multi-switch S1, as shown. Rather than present a description of the operation of each individual relay for the respective trunk types (which is unnecessary for understanding the present invention), attention may be directed to Table I, below, which shows the manner in which the contacts S1-1 ... S1-4 of trunk type-select multi-switch S1 are connected when the ringback apparatus is associated with the trunk type indicated. Also tabulated in Table I is the selective connection of contact S2-4 of an additional switch contained within an "absorb" selection switch S2, to be described below.

TABLE I

| Trunk Type | Switch Contact | | | | |
|---|---|---|---|---|---|
| | S1-1 | S1-2 | S1-3 | S1-4 | S2-4 |
| Two-Wire | ON | ON | OFF | OFF | OFF |
| Two-Wire + A&B | ON | ON | ON | OFF | OFF |
| E&M Type I | OFF | OFF | ON | ON | ON |
| E&M Type II | OFF | OFF | OFF | OFF | ON |
| E&M Type III | OFF | OFF | OFF | ON | ON |

In addition to interfacing the subscriber ringback apparatus of the present invention with different types of central office circuits, the present invention provides the capability of interfacing different signalling formats. Specifically, different telephone companies have established specific ringback code formats as part of their signalling scheme. To handle the insertion of additional digits which are not required for initiating action in the subscriber ringback apparatus in accordance with the present invention, the system employs an additional selector switch circuit S2 which is used to effectively 'absorb' unnecessary digits that may be inserted in the signalling format for the central office of the telephone company with which the invention is employed. The setting of the contacts of the switches S2-1 ... S2-3 is in accordance with Table II below. As noted above switch S2 contains a switch contact S2-4 which is employed as part of the interface mechanism which includes relays 23-25, described above. With the three switches S2-1 .. . S2-3, the present invention is able to absorb up to seven additional digits.

TABLE II

| Digits Absorbed | Switch Contact | | |
|---|---|---|---|
| | S2-1 | S2-2 | S2-3 |
| 0 | OFF | OFF | OFF |
| 1 | OFF | OFF | ON |
| 2 | OFF | ON | OFF |
| 3 | OFF | ON | ON |
| 4 | ON | OFF | OFF |
| 5 | ON | OFF | ON |
| 6 | ON | ON | OFF |
| 7 | ON | ON | ON |

OPERATION

User Ringback

As pointed out previously, the subscriber ringback function is initiated by the calling subscriber accessing a communications equipment facility at the central office (i.e. a toll trunk) by dialling a prescribed code (such as a prefix "1" or "0" followed by three consecutive numbers).

The central office routes the subscriber's call through the toll trunk to link 11. The toll trunk, when activated, draws loop current, energizing coils 22T and 22R of relay 22, thereby closing contact 22C and causing a trunk seizure signal to be coupled via link 103, closed switch contact S1-2 of switch S1, and through link 140 to the processor 150. In response to seeing that the trunk is seized, processor 150 acknowledges to the central office receipt of the call by momentarily reversing trunk loop current through contacts 21A, 21B, 21T and 21R of relay 21 or by causing closure of the contactds of relay 25 in the case of E & M trunks. The acknowledgement signal from processor 150 passes through the appropriate relay, as noted above, through trunk 160. Processor 150 then monitors link 101 via decoder 141 and link 151 for incoming multi-frequency tones that have been routed through the toll trunk. As pointed out above, the present invention provides the facility for handling up to seven additional numbers through absorb selector switch S2. Assuming that there are to be no digits absorbed, each of switches S2-1 ... S2-3 will be turned off (or open), as shown in Table II above. The output of decoder 142 and the outputs of switch S2 are coupled over link 152 to processor 150. Processor 150, upon decoding the routed signalling from the subscriber, observes that a subscriber ringback operation is to take place and advises the trunk by momentarily reversing the condition of the contacts of relay 21 via a signal over line 160. It then monitors link 101 for the multi-frequency signals that are generated by the toll circuit and which contain the telephone number of the calling party. These multi-frequency signals are coupled over link 101 and decoded by decoder 141. The decoded number output of decoder 141 is coupled over link 151 and stored in memory. The processor next causes the generation of a synthesized voice signal which instructs the calling party to "please hang-up". This synthesized voice signal is coupled over link 161 through synthetic speech filter 162 to output driver 165. The output of driver 165 is coupled over link 101 through transformer T1 and link 11 to the toll trunk of the central office.

Assuming that the calling subscriber follows the instructions given, he, will hang-up or go back on-hook, causing loop current in link 11 to cease. The termination of loop current opens relay contact 22C of relay 22 and changes the state of link 140, advising the processor that the calling party has hung-up. In response to detecting that the calling party has hung-up, processor 150 asserts a line seize signal on link 118, causing line seizure circuit LS1 to place terminating resistor R1 across bridge BR1. As noted previously, bridge BR1 is a full wave rectifier, making the tip and ring portions of link 12 interchangeable (bridge BR1 effectively acts as a polarity guard). The placing of resistor R1 across link 12 causes loop current to be drawn, in turn causing dial tone to be placed across lines 111 and 112. The dial tone signal is coupled to differential amplifier 121 and filter 122. The output of filter 122 is compared by comparator 123 with the analog reference voltage supplied by analog reference voltage circuit 124. If the magnitude of the dial tone signal exceeds the level set by the reference, a train of pulses corresponding to the frequency of the dial tone is supplied to tone detector 125. The negative-going pulses supplied by comparator 123 rapidly discharge capacitor 126 of the tone detector 125 through resistor 127, causing the output of detector 125 to go high, thereby turning on transistor Q2 and changing the state of line 131 to processor 150. The change of state of line 131 tells processor 150 that dial tone is now present.

Knowing that dial tone is present (the processor now has access to a line), processor 150 interrupts the steady state high level on link 118, and effectively chops the current through line seizure circuit LS1 and causes dial pulse signals to be transmitted over link 12 to the central office. The dial pulse signals correspond to the stored number that has been accessed from memory. Assuming that the user's handset has been placed on-hook, the dial pulse signals proceed through the central office, which then sends ringing voltage out to the user's telephone, causing the phone to ring. Preferably, processor 150 contains an internal soft timer which causes the processor to disconnect itself after a prescribed number of ringing cycles (e.g. ten), in response to the subscriber answering, etc. When the processor disconnects, it changes the state of link 118 from a high to a low level, thereby deenergizing line seizure circuit, and decoupling resistor R1 from link 12.

User Line Busy

The sequence of events described above assumes that the user (e.g. subscriber) has hung-up the phone and has waited for ringback to be supplied by the ringback apparatus. However, in response to the voice announcement to "please hang-up" the phone, with the phone being placed back on hook, it could happen that the user's phone could be accessed by another calling party (rather than the ringback apparatus). In this event, when the processor dials the number, it will receive a busy tone over link 12. The busy tone is detected by differential amplifier 121, tone filter 122 and tone detector 125 and coupled as a pulsating signal over link 131, rather than a steady state signal which was previously supplied to the processor. This pulsating signal (which represents the busy tone) on link 131 advises the processor to hang-up and try again. In response, the processor may repeatedly attempt a callback to the user's phone for some prescribed number of busy tone cycles (e.g. five busy tone cycles). If the line is still busy after the prescribed number of cycles, the processor returns line 118 to its low condition, thus returning line 12 to an on-hook (disconnected) condition. As a consequence, by having intercepted another call, the user will have to reaccess the ringback apparatus if he wishes to carry out a ringback operation.

Craftsperson Line Quality Test

In addition to the capability of ringing back a calling party such as a residential telephone user or a craftsperson, the present invention also provides the capability of supplying prescribed line test conditions (selected tones and impedance terminations) to the telephone link, so that the telephone line may be monitored by the craftsperson. To initiate these test operations, the craftsperson ignores the "please hang-up" message supplied by the processor. By failing to hang-up, the trunk seize voltage level on link 140 does not go away, advising the processor that a test function is to be carried out, rather than a normal subscriber ringback function.

To this end, after the lapse of a prescribed time interval subsequent to outputting the synthesized voice "please hang-up" signal over link 101 to the calling subscriber, the processor monitors the output of decoder 142 for the presence of an additional "security" testing code that is input to the system by the craftsperson. This additional code causes the processor to generate a prescribed voice announcement in the same manner that the "please hang-up" synthesized voice announcement was generated to the subscriber originally. The voice announcement preferably is the telephone number of the calling party, so as to confirm to the craftsperson of proper phone identification continuity. The craftsperson may then initiate further tests by supplying additional function codes, to be described below.

Multiple Tone Test

Pursuant to a first enhancement of the present invention, an authorized craftsperson may cause the ringback apparatus to generate a programmed multiple tone output, so that the craftsperson may monitor the quality of the line in response to that tone output. For this purpose, in response to dialling a prescribed test initiation code, the processor supplies a sequence of individual tones (e.g. a 400 Hz, 100 Hz and 3,000 Hz tone sequence), each tone being of a prescribed duration through link 171 to tone filter 172. The magnitude of the tone signal is programmable through encoding link 193 to tone attenuator multiplexers 183 and 185, described above. The tone sequence, the amplitude of which has been preset by the processor, is output through amplifier 205 and line driver 165 to link 101 for application through transformer T1 to link 11. Each tone is of a prescribed duration (e.g. twenty seconds) with a prescribed silent period between each frequency (e.g. five seconds).

The amplitude levels of the tones may be adjusted by the craftsperson by keying in prescribed codes as a preamble to the code test, in response to which the amplitude control code over link 193 is adjusted by the processor.

In addition to the multiple tone test, the subscriber ringback apparatus may execute what is known as a "quiet termination" condition. For this test, a selected impedance termination provided by precision resistor network 201 (e.g. a 600 Ohm, 900 Ohm or 735 Ohm resistance with a capacitor of 2.2 microfarads in series) is selected by processor 150 by energizing one of relays 27 and 28 via links 212 and 213. With the precision resistor network 201 being coupled across ports A and B, link 11 will be terminated at the programmed resistor value. To isolate the line, a quiet termination signal is supplied over link 211 which energizes relay 26 and opens contact 26-1 of circuit link 101, thereby opening the secondary transformer T1. At the same time, contact 26-2 closes, completing the connection of the precision terminating impedance to the toll trunk link 11.

As will be appreciated from the foregoing description, the present invention provides a versatile mechanism that allows telephone companies to standardize a scheme through which subscribers and craftspersons may ring back the telephone from which they are calling. Access to a single universal number for use through the system will free up NXX codes that are currently assigned to existing ringback services. In addition, the ringback apparatus according to the present invention enables field repair personnel to receive a synthesized voice indication of the POTS number from which he is calling and to conduct line quality tests, all of which may be initiated by keyed tone signalling from the handset.

While we have shown and described an embodiment in accordance with the present invention, it is to be understood that the same is not limited thereto but is susceptible to numerous changes and modifications as known to a person skilled in the art, and we therefore do not wish to be limited to the details shown and described herein but intend to cover all such changes and modifications as are obvious to one of ordinary skill in the art.

What is claimed:

1. For use with a central office facility having communication equipment through which the identification of a telephone employed by a telephone system user for accessing said office may be provided, an apparatus, connectable via a telephone link with said central office, for enabling a telephone system user to effect a ringback of the telephone from which the telephone system user is calling comprising:
   first means, responsive to a prescribed code signal generated via the telephone of said telephone system user, for causing said communication equipment to transmit a message representative of the number of the telephone from which the user is calling;
   second means, coupled with said first means, for receiving and storing said telephone number representative message;
   third means, responsive to the operation of said second means, for transmitting a message to said user in response to which said user returns said telephone to its idle condition; and
   fourth means, responsive to said telephone having been returned to its idle condition, for transmitting dialing signals containing the number of said telephone and causing the ringing of said telephone.

2. An apparatus according to claim 1, wherein said third means comprises means for transmitting a voice message to said user for causing said user to return said telephone to its idle condition.

3. An apparatus according to claim 1, wherein said fourth means includes means for monitoring the idle/busy condition of said telephone and, upon detecting that said telephone has been returned to the idle condition, transmitting said dialing signals for causing the ringing of said telephone.

4. An apparatus according to claim 3, wherein said fourth means includes means, responsive to detecting that said telephone has been placed in a busy condition, for retransmitting said dialing signals a prescribed number of times or until said telephone is no longer in a busy condition, whereby ringing of said telephone may be effected.

5. An apparatus according to claim 1, wherein said communication equipment includes a toll trunk facility.

6. An apparatus according to claim 1, wherein said fourth means includes means, responsive to said telephone not being returned to its idle condition, for transmitting a message to said telephone instructing said user to carry out a function other than a ringback function.

7. An apparatus according to claim 6, wherein said other function comprises said user transmitting a message for causing said fourth means to transmit selected signals to said telephone.

8. An apparatus according to claim 7, wherein said selected signals correspond to tone signals prescribed characteristics of which are programmable.

9. An apparatus according to claim 7, wherein said selected signals are representative of the telephone number of said telephone.

10. An apparatus according to claim 6, wherein said other function comprises said user transmitting a message for causing said fourth means to terminate said telephone link with a prescribed impedance.

11. An apparatus according to claim 1, further including fifth means for enabling said apparatus to be selectively interfaced with a respective one of plurality of differently configured telephone links.

12. An apparatus according to claim 1, wherein said first means includes means for ignoring selected portions of a code generated via the telephone of said telephone user, so as to be responsive to that portion of the generated code corresponding to said prescribed code.

13. An apparatus according to claim 1, wherein said third means comprises means for transmitting a voice message to said user containing an instruction to said user to return said telephone to its idle condition.

14. An apparatus according to claim 13, wherein said fourth means includes means, responsive to detecting that said telephone has been placed in a busy condition, for retransmitting said dialing signals a prescribed number of times or until said telephone is no longer in a busy condition, whereby ringing of said telephone may be effected.

15. An apparatus according to claim 13, wherein said fourth means includes means, responsive to said telephone not being returned to its idle condition, for transmitting a message to said telephone instructing said user to carry out a function other than a ringback function.

16. An apparatus according to claim 15, further including fifth means for enabling said apparatus to be selectively interfaced with a respective one of plurality of differently configured telephone links.

17. An apparatus according to claim 16, wherein said first means includes means for ignoring selected portions of a code generated via the telephone of said telephone user, so as to be responsive to that portion of the generated code corresponding to said prescribed code.

18. For use with a central office facility having communication equipment through which the identification of a telephone employed by a telephone system user for accessing said office may be provided, a method for enabling a telephone system user to effect a ringback of the telephone from which the telephone system user is calling comprising the steps of:
   (a) in response to a prescribed code signal generated via the telephone of said telephone system user, causing said communication equipment to transmit a message representative of the number of the telephone from which the user is calling;
   (b) receiving and storing said telephone number representative message;
   (c) transmitting a message to said user in response to which said user returns said telephone to its idle condition; and
   (d) in response to said telephone having been returned to its idle condition, transmitting dialing signals containing the number of said telephone and causing the ringing of said telephone.

19. A method according to claim 18, wherein step (c) comprises transmitting a voice message to said user for causing said user to return said telephone to its idle condition.

20. A method according to claim 18, wherein step (d) comprises monitoring the idle/busy condition of said telephone and, upon detecting that said telephone has been returned to the idle condition, transmitting said dialing signals for causing the ringing of said telephone.

21. A method claim 20, wherein step (d) comprises retransmitting said dailing signals in response to detecting that said telephone is in a busy condition.

22. A method according to claim 18, wherein said communication equipment includes a toll trunk facility.

23. A method according to claim 18, wherein step (d) comprises, in response to said telephone not being returned to its idle condition, transmitting a message to said telephone instructing said user to carry out a function other than a ringback function.

24. A method according to claim 23, wherein said other function comprises said user transmitting a message for causing the transmission of selected signals to said telephone.

25. A method according to claim 24, wherein said selected signals correspond to tone signals prescribed characteristics of which are programmable.

26. A method according to claim 24, wherein said selected signals are representative of the telephone number of said telephone.

27. A method according to claim 23, wherein said other function comprises said user transmitting a message for causing said telephone link to be terminated with a prescribed impedance.

28. A method according to claim 18, wherein step (a) includes ignoring selected portions of a code generated via the telephone of said telephone user, so as to be responsive to that portion of the generated code corresponding to said prescribed code.

29. A method according to claim 18, wherein step (c) comprises transmitting a voice message to said user containing an instruction to said user to return said telephone to its idle condition.

30. A method according to claim 29, wherein step (d) comprises retransmitting said dialing signals in response to detecting that said telephone is in a busy condition.

31. A method according to claim 30, wherein step (d) comprises, in response to said telephone not being returned to its idle condition, transmitting a message to said telephone instructing said user to carry out a function other than a ringback function.

32. A method according to claim 31, wherein step (a) comprises ignoring selected portions of a code generated via the telephone of said telephone user, so as to be responsive to that portion of the generated code corresponding to said prescribed code.

* * * * *